(12) United States Patent
Murdoch et al.

(10) Patent No.: US 8,959,992 B1
(45) Date of Patent: Feb. 24, 2015

(54) SOLAR-POWERED WINDSOCK ASSEMBLY

(71) Applicants: Ronald S. Murdoch, Tweed (CA);
Monique Murdoch, Tweed (CA)

(72) Inventors: Ronald S. Murdoch, Tweed (CA);
Monique Murdoch, Tweed (CA)

( * ) Notice: Subject to any disclaimer, the term of this patent is extended or adjusted under 35 U.S.C. 154(b) by 0 days.

(21) Appl. No.: 13/875,868

(22) Filed: May 2, 2013

(51) Int. Cl.
*G01P 13/00* (2006.01)
*G01P 13/02* (2006.01)

(52) U.S. Cl.
CPC ..................................... *G01P 13/02* (2013.01)
USPC ..................................... 73/170.01; 73/170.16

(58) Field of Classification Search
USPC .......................................... 73/170.01–170.16
See application file for complete search history.

(56) References Cited

U.S. PATENT DOCUMENTS

| | | | |
|---|---|---|---|
| 4,627,278 A | 12/1986 | Soto | |
| 6,192,824 B1 | 2/2001 | Chang | |
| D580,082 S | 11/2008 | Zemar | |
| D652,975 S | 1/2012 | Harshaw | |
| 8,091,420 B2 | 1/2012 | Al Wehebi | |
| 2005/0279403 A1* | 12/2005 | Kube | 136/291 |
| 2011/0109088 A1* | 5/2011 | Cook | 290/52 |
| 2011/0226051 A1* | 9/2011 | Al-Wehebi | 73/170.06 |
| 2012/0001428 A1* | 1/2012 | Calhoon et al. | 290/44 |
| 2012/0113625 A1 | 5/2012 | Werner et al. | |

FOREIGN PATENT DOCUMENTS

DE 20212352 U1 * 2/2004
DE 102010019164 A1 * 11/2011

* cited by examiner

*Primary Examiner* — Andre Allen

(57) ABSTRACT

A solar-powered windsock assembly indicates wind direction and relative wind speed while also providing a light for illuminating the assembly at night. The assembly includes an elongated tube having an open top end, an open bottom end, and a perimeter wall extending between the open top and bottom ends. A support apparatus is coupled to the tube and extends upwardly away from the open top end wherein the support apparatus is configured for coupling the tube to a mounting pole and directing wind therethrough. A plurality of solar cells is coupled to the tube and electrically coupled to a power supply wherein the solar cells recharge the power supply. A light is coupled to the tube and is operationally coupled to the solar cells wherein the light is configured to emit light energy through the tube when the power supply delivers power to the light.

14 Claims, 3 Drawing Sheets

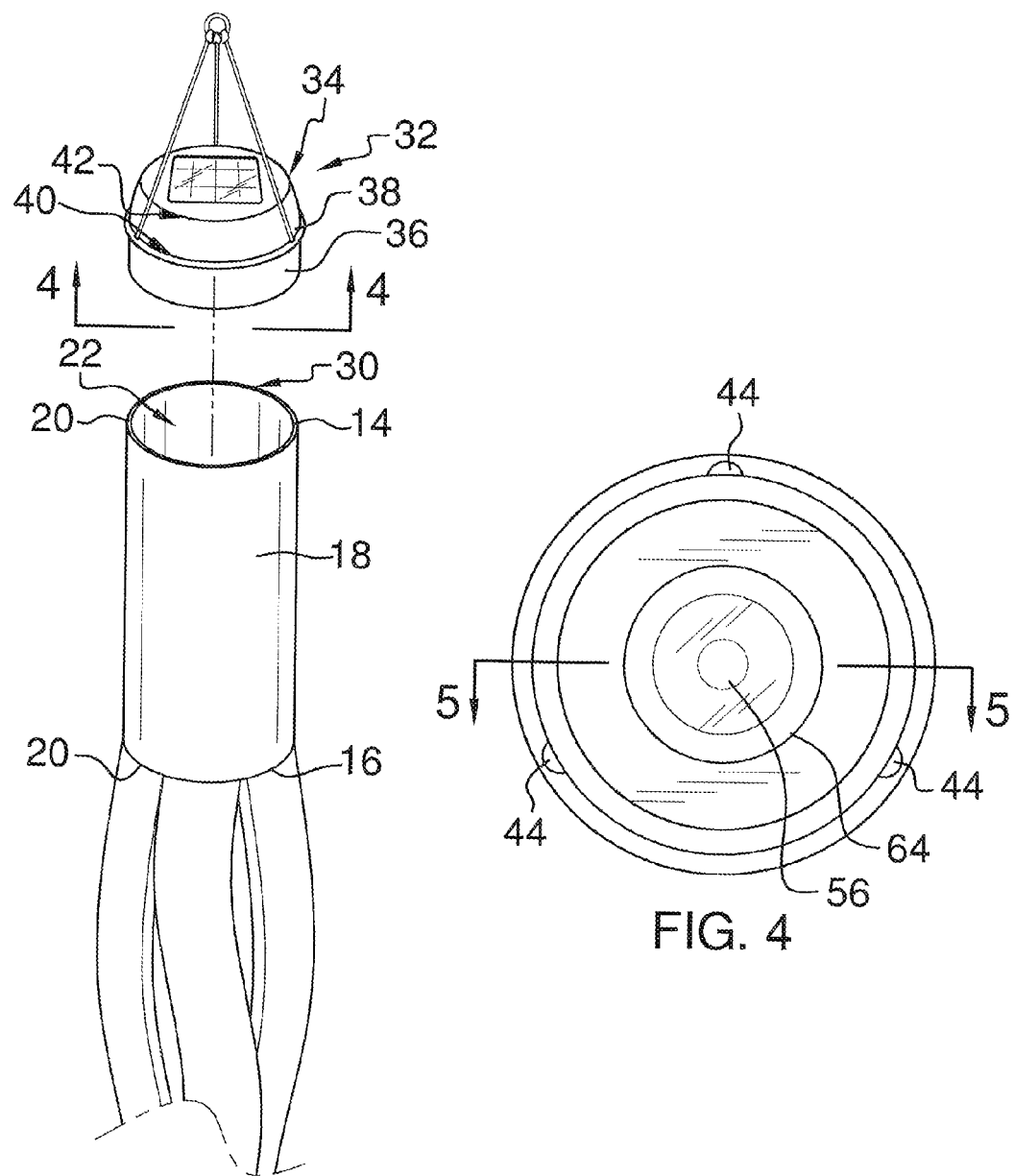

SOLAR-POWERED WINDSOCK ASSEMBLY

BACKGROUND OF THE DISCLOSURE

Field of the Disclosure

The disclosure relates to windsock assemblies and more particularly pertains to a new windsock assembly for indicating wind direction and relative wind speed while also providing a light for illuminating the assembly at night.

SUMMARY OF THE DISCLOSURE

An embodiment of the disclosure meets the needs presented above by generally comprising an elongated tube having an open top end, an open bottom end, and a perimeter wall extending between the open top and bottom ends. A support apparatus is coupled to the tube and extends upwardly away from the open top end wherein the support apparatus is configured for coupling the tube to a mounting pole and directing wind therethrough. A plurality of solar cells is coupled to the tube and electrically coupled to a power supply wherein the solar cells recharge the power supply. A light is coupled to the tube and is operationally coupled to the solar cells wherein the light is configured to emit light energy through the tube when the power supply delivers power to the light.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a partially-exploded top front side perspective view of an embodiment of the disclosure.

FIG. 4 is a bottom view of a support apparatus of an embodiment of the disclosure.

DESCRIPTION OF THE PREFERRED EMBODIMENT

Figure 2:
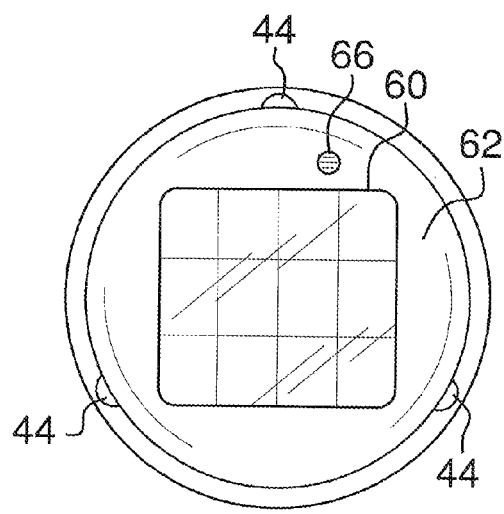
FIG. 2 is a top view of a support apparatus of an embodiment of the disclosure.
Figure 1:
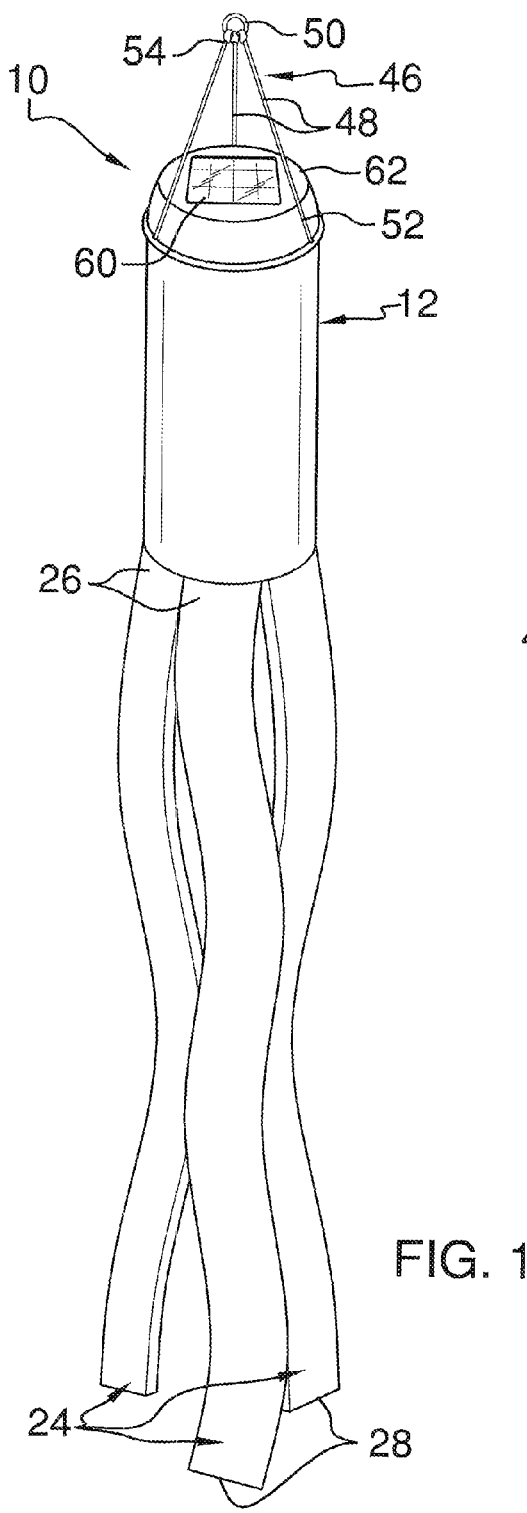
FIG. 1 is a top front side perspective view of a solar-powered windsock assembly according to an embodiment of the disclosure.
Figure 5:
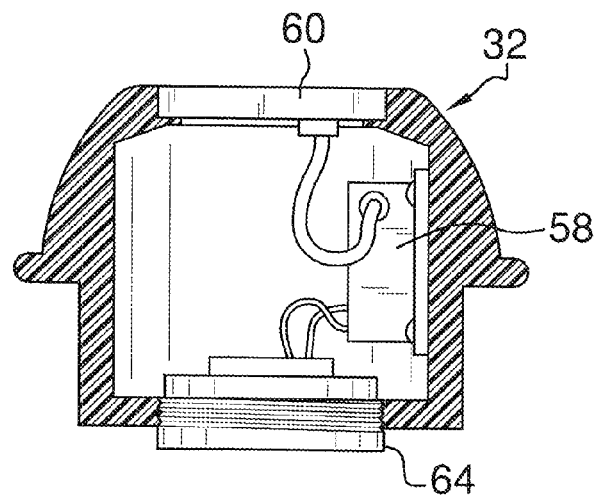
FIG. 5 is a cross-sectional view of an embodiment of the disclosure taken along line 5-5 of FIG. 4.
Figure 6:
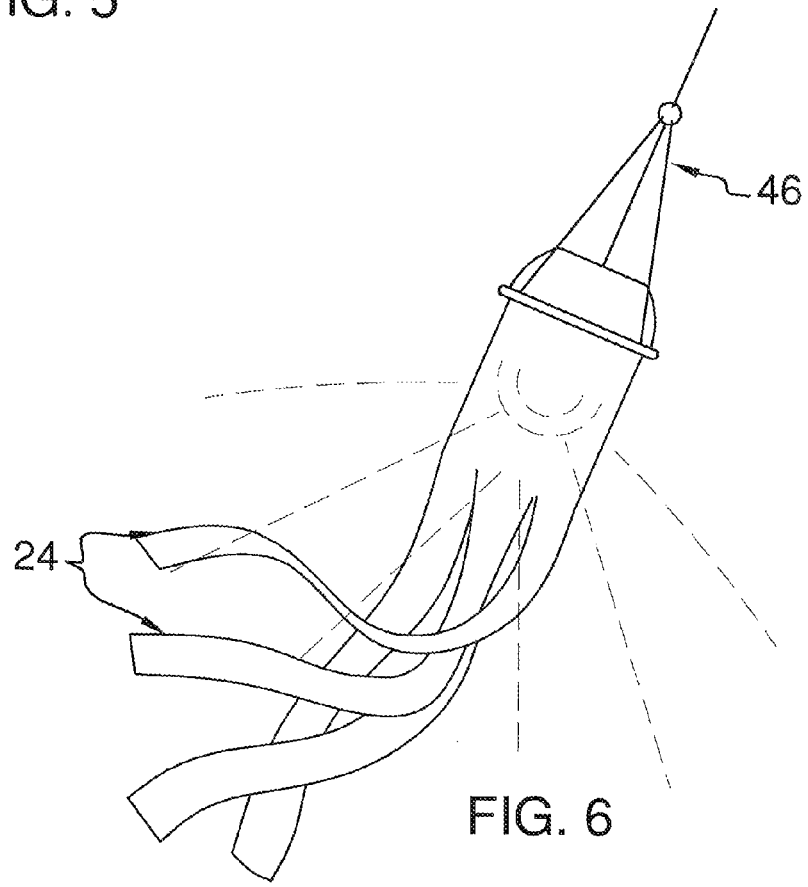
FIG. 6 is a front view of an embodiment of the disclosure in use.

With reference now to the drawings, and in particular to FIGS. 1 through 6 thereof, a new windsock assembly embodying the principles and concepts of an embodiment of the disclosure and generally designated by the reference numeral 10 will be described.

As best illustrated in FIGS. 1 through 6, the solar-powered windsock assembly 10 generally comprises an elongated tube 12 having an open top end 14, an open bottom end 16, and a perimeter wall 18 extending between the open top 14 and bottom ends 16. The perimeter wall 18 and a perimeter edge 20 of each of the open top 14 and bottom ends 16 define an interior space 22 of the tube 12. A plurality of tails 24 is coupled to the tube 12. A first end 26 of each of the tails 24 is coupled to the perimeter edge 20 of the open bottom end 16. A second end 28 of each of the tails 24 is freely suspended from the tube 12 wherein the tails 24 are configured to blow in the direction of the wind. The tails 24 may extend a full length around the open bottom end 16 of the tube 12. The tube 12 and the tails 24 may have indicia positioned thereon.

An opening 30 is defined by the perimeter edge 20 of the open top end 14 of the tube 12. A cap 32 is couplable to the tube 12 and has an upper portion 34, a lower portion 36, and a ring 38 extending between the upper and lower portions 34, 36. The upper portion 34 may extend upwardly and inwardly from a bottom edge 40 to a top edge 42 of the upper portion 34. The ring 38 may be aligned with the bottom edge 40 of the upper portion 34. The lower portion 36 has a smaller circumference than the upper portion 34 wherein the lower portion 36 is configured to be received within the interior space 22 of the tube 12 when the cap 32 is positioned over and closes the opening 30.

A plurality of slots 44 extends into the cap 32. The slots 44 are spaced and extend downwardly into the ring 38 proximate the bottom edge 40 of the upper portion 34. A support apparatus 46 is coupled to the cap 32. The support apparatus 46 extends upwardly away from the open top end 14 when the cap 32 is coupled to the tube 12 wherein the support apparatus 46 is configured for coupling the tube 12 to a mounting pole and directing wind therethrough. In addition to mounting poles, the support apparatus 46 may be mounted to any conventional support structure that is well known in the art. The support apparatus 46 comprises a plurality of support members 48 and a support ring 50. The support members 48 couple the support ring 50 to the ring 38 of the cap 32. A first end 52 of each of the support members 48 is insertable into an associated one of the slots 44. A second end 54 of each of the support members 48 is coupled to the support ring 50. The support ring 50 may be positioned above a center 56 of the cap 32 such that the support members 48 extend upwardly and inwardly above the cap 32 toward the support ring 50.

A power supply 58 is mounted in the cap 32 wherein the power supply 58 comprises a rechargeable battery. A plurality of solar cells 60 is coupled to the cap 32 and electrically coupled to the power supply 58 wherein the solar cells 60 recharge the power supply 58. The solar cells 60 may be centrally positioned on a top surface 62 of the upper portion 34 of the cap 32. A light 64 is mounted to the cap 32 and is operationally coupled to the solar cells 60 wherein the light 64 is configured to emit light energy through the perimeter wall 18, the open top end 14, and the open bottom end 16 when the power supply 58 delivers power to the light 64. The light 64 may comprise an L.E.D. A light sensor 66 may be coupled to the cap 32 and positioned proximate the solar cells 60. The light sensor 66 is operationally coupled to the light 64 and the solar cells 60 wherein the light sensor 66 activates the light 64 when the solar cells 60 are inactivated and deactivates the light 64 when the solar cells 60 are activated.

In use, as stated above and shown in the Figures, the cap 32 is coupled to the tube 12 and in so doing, closes the opening 30. The support apparatus 46 is mounted to a mounting pole or similar support structure in order to suspend the assembly 10. Wind is directed through the interior space 22 of the tube 12 such that the tube 12 indicates direction and relative speed of the wind. The light sensor 66 detects whether the solar cells 60 are activated or inactivated such that the light sensor 66 activates the light 64 when the solar cells 60 are inactivated and deactivates the light 64 when the solar cells 60 are activated. In this manner, the assembly 10 is illuminated at night.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A solar-powered windsock assembly comprising:
    an elongated tube, said tube having an open top end, an open bottom end, and a perimeter wall extending between said open top and bottom ends;
    a support apparatus coupled to said tube, said support apparatus extending upwardly away from said open top end wherein said support apparatus is configured for coupling said tube to a mounting pole and directing wind therethrough;
    a plurality of solar cells coupled to said tube, said solar cells being electrically coupled to a power supply wherein said solar cells recharge said power supply;
    a light coupled to said tube, said light being operationally coupled to said solar cells wherein said light is configured to emit light energy through said perimeter wall, said open top end, and said open bottom end when said power supply delivers power to said light; and
    a light sensor operationally coupled to said light and said solar cells wherein said light sensor activates said light when said solar cells are inactivated and deactivates said light when said solar cells are activated.

2. The assembly of claim 1, further comprising a plurality of tails being coupled to said tube, a first end of each of said tails being coupled to a perimeter edge of said open bottom end, a second end of each of said tails being freely suspended from said tube wherein said tails are configured to blow in the direction of the wind.

3. The assembly of claim 2, further comprising said tails extending a full length around said open bottom end of said tube.

4. The assembly of claim 1, further comprising a cap couplable to said tube, said cap having an upper portion, a lower portion, and a ring extending between said upper and lower portions.

5. The assembly of claim 4, further comprising said upper portion extending upwardly and inwardly from a bottom edge to a top edge of said upper portion.

6. The assembly of claim 5, further comprising a plurality of slots extending into said cap, said slots being spaced and extending downwardly into said ring proximate said bottom edge of said upper portion.

7. The assembly of claim 4, further comprising said ring being aligned with said bottom edge of said upper portion.

8. The assembly of claim 4, further comprising:
    an interior space of said tube being defined by said perimeter wall and a perimeter edge of each of said open top and bottom ends;
    an opening being defined by said perimeter edge of said open top end of said tube; and
    said lower portion having a smaller circumference than said upper portion wherein said lower portion is configured to be received within said interior space of said tube when said cap is positioned over and closes said opening.

9. The assembly of claim 4, further comprising said support apparatus comprising a plurality of support members and a support ring, said support members coupling said support ring to said ring of said cap.

10. The assembly of claim 9, further comprising:
    a plurality of slots extending into said cap, said slots being spaced and extending downwardly into said ring; and
    a first end of each of said support members being insertable into an associated one of said slots, a second end of each of said support members being coupled to said support ring.

11. The assembly of claim 9, further comprising said support ring being positioned above a center of said cap such that said support members extend upwardly and inwardly above said cap toward said support ring.

12. The assembly of claim 4, further comprising said solar cells being centrally positioned on a top surface of said upper portion of said cap.

13. The assembly of claim 4, further comprising said light being mounted to said cap.

14. A solar-powered windsock assembly comprising:
    an elongated tube, said tube having an open top end, an open bottom end, and a perimeter wall extending between said open top and bottom ends, said perimeter wall and a perimeter edge of each of said open top and bottom ends defining an interior space of said tube;
    a plurality of tails being coupled to said tube, a first end of each of said tails being coupled to said perimeter edge of said open bottom end, a second end of each of said tails being freely suspended from said tube wherein said tails are configured to blow in the direction of the wind, said tails extending a full length around said open bottom end of said tube;
    an opening being defined by said perimeter edge of said open top end of said tube;
    a cap couplable to said tube, said cap having an upper portion, a lower portion, and a ring extending between said upper and lower portions, said upper portion extending upwardly and inwardly from a bottom edge to a top edge of said upper portion, said ring being aligned with said bottom edge of said upper portion, said lower portion having a smaller circumference than said upper portion wherein said lower portion is configured to be received within said interior space of said tube when said cap is positioned over and closes said opening;
    a plurality of slots extending into said cap, said slots being spaced and extending downwardly into said ring proximate said bottom edge of said upper portion;
    a support apparatus coupled to said cap, said support apparatus extending upwardly away from said open top end when said cap is coupled to said tube wherein said support apparatus is configured for coupling said tube to a mounting pole and directing wind therethrough, said support apparatus comprising a plurality of support members and a support ring, said support members coupling said support ring to said ring of said cap, a first end of each of said support members being insertable into an associated one of said slots, a second end of each of said support members being coupled to said support ring, said support ring being positioned above a center of said cap such that said support members extend upwardly and inwardly above said cap toward said support ring;

a power supply mounted in said cap wherein said power supply comprises a rechargeable battery;

a plurality of solar cells coupled to said cap, said solar cells being electrically coupled to said power supply wherein said solar cells recharge said power supply, said solar cells being centrally positioned on a top surface of said upper portion of said cap;

a light mounted to said cap, said light being operationally coupled to said solar cells wherein said light is configured to emit light energy through said perimeter wall, said open top end, and said open bottom end when said power supply delivers power to said light; and a light sensor coupled to said cap and positioned proximate said solar cells, said light sensor being operationally coupled to said light and said solar cells wherein said light sensor activates said light when said solar cells are inactivated and deactivates said light when said solar cells are activated.

\* \* \* \* \*